(12) United States Patent
Morley

(10) Patent No.: US 8,714,365 B2
(45) Date of Patent: May 6, 2014

(54) FRUIT HANDLING EQUIPMENT

(75) Inventor: Bruce Thomas Morley, Buninyong (AU)

(73) Assignee: MAF Agrobotic, Montauban (FR)

( * ) Notice: Subject to any disclaimer, the term of this patent is extended or adjusted under 35 U.S.C. 154(b) by 161 days.

(21) Appl. No.: 13/145,150

(22) PCT Filed: Jan. 22, 2010

(86) PCT No.: PCT/AU2010/000063
§ 371 (c)(1),
(2), (4) Date: Jul. 19, 2011

(87) PCT Pub. No.: WO2010/083567
PCT Pub. Date: Jul. 29, 2010

(65) Prior Publication Data
US 2011/0309004 A1  Dec. 22, 2011

(30) Foreign Application Priority Data

Jan. 23, 2009  (AU) ................................ 2009900276

(51) Int. Cl.
*B03B 7/00* (2006.01)
(52) U.S. Cl.
USPC ............ 209/606; 209/509; 209/617; 209/646
(58) Field of Classification Search
USPC .................. 209/509, 552, 606, 617, 646, 685
See application file for complete search history.

(56) References Cited

U.S. PATENT DOCUMENTS

| | | | | |
|---|---|---|---|---|
| 4,825,999 A | * | 5/1989 | Hammer | 198/834 |
| 5,324,143 A | * | 6/1994 | Sanders | 406/67 |
| 5,611,419 A | * | 3/1997 | LaVars | 198/370.04 |
| 5,626,238 A | | 5/1997 | Blanc | |
| 5,878,863 A | * | 3/1999 | Madden et al. | 198/370.04 |
| 6,079,542 A | * | 6/2000 | Blood | 198/384 |
| 6,246,023 B1 | * | 6/2001 | Kugle | 209/584 |
| 6,374,983 B1 | * | 4/2002 | Morigi | 198/370.07 |
| 7,222,715 B2 | * | 5/2007 | Madden et al. | 198/370.04 |

OTHER PUBLICATIONS

International Search Report for PCT/AU2010/000063.
International Preliminary Report on Patentability for PCT/AU2010/000063.

* cited by examiner

*Primary Examiner* — Terrell Matthews
(74) *Attorney, Agent, or Firm* — Stites & Harbison PLLC; Douglas E. Jackson

(57) ABSTRACT

Fruit handling equipment comprising a conveyor having a plurality of linked carriages, each supporting at least one fruit carrying cup pivotally secured to the carriage, each cup having a latching mechanism operable to hold the cup in a fruit carrying mode and releasable to cause the cup to pivot to a delatched position to eject the fruit, and remotely controllable means in each carriage to release the latching mechanism.

20 Claims, 14 Drawing Sheets

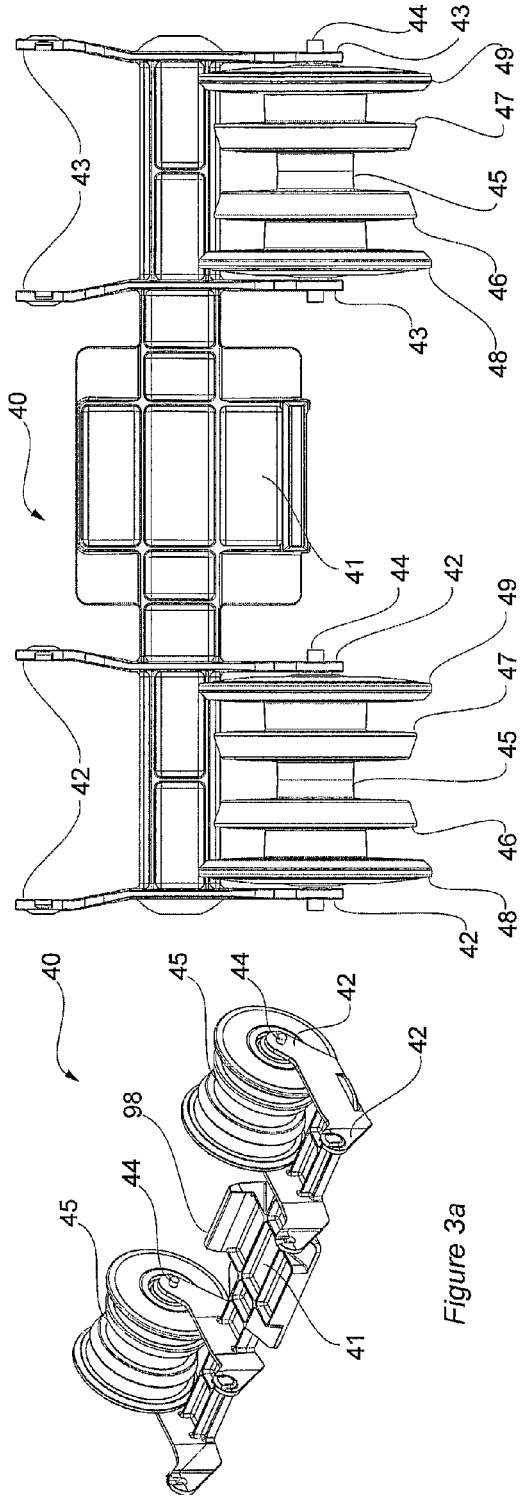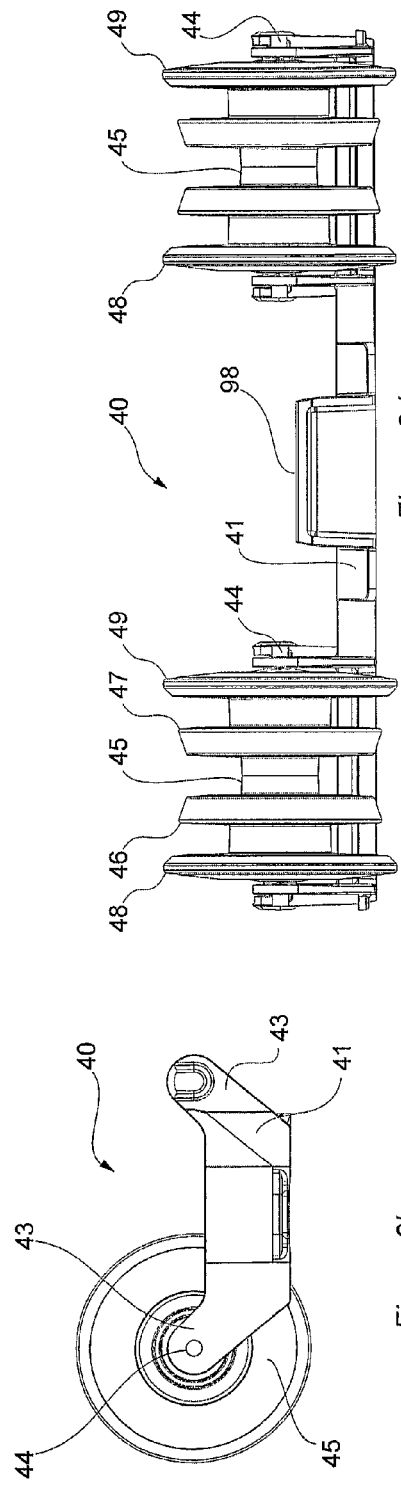

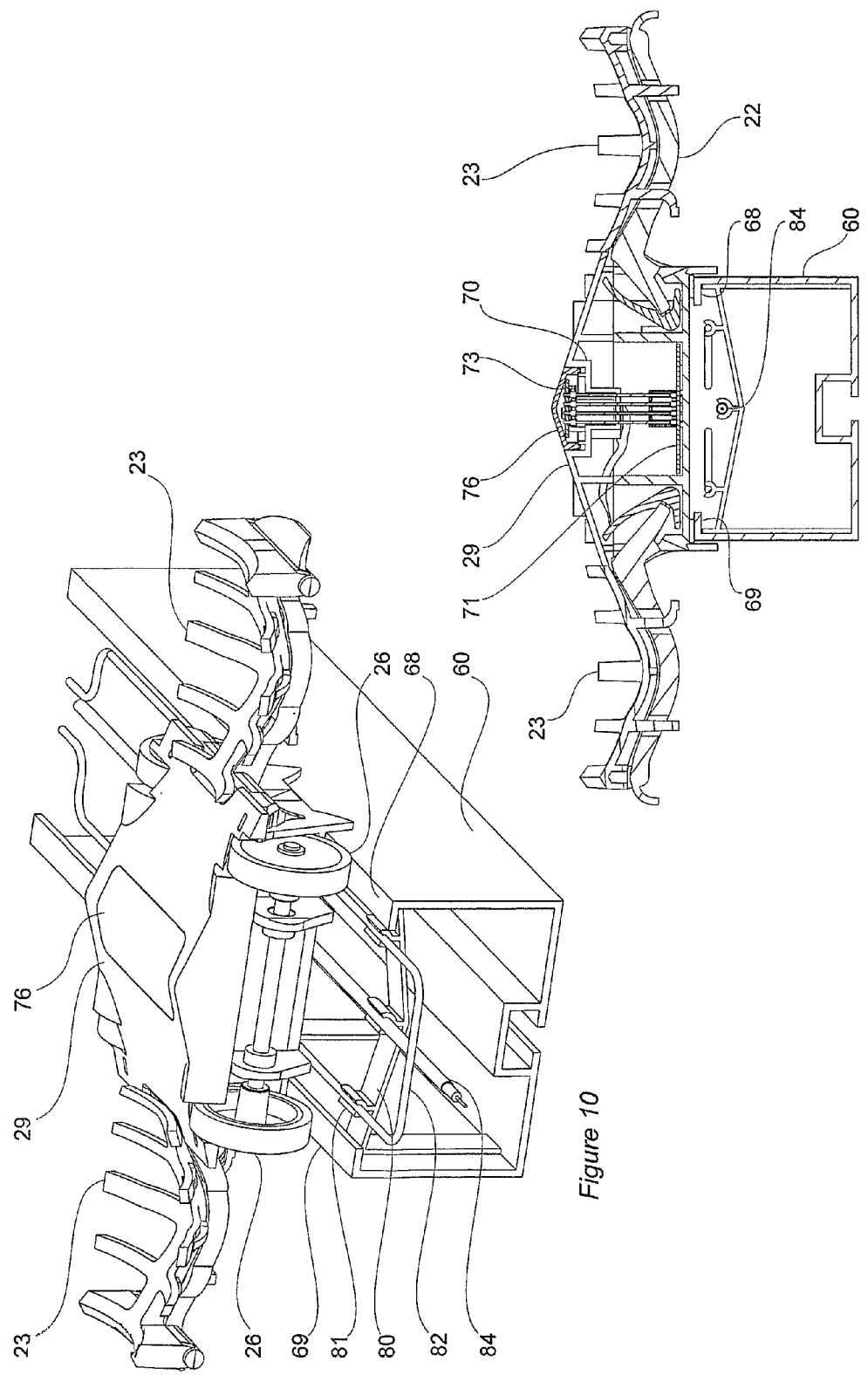

FRUIT HANDLING EQUIPMENT

This invention relates to fruit handling equipment and, in particular, relates to a conveyor system which carries fruit that is rotated past a photographic zone, weighed at a weighing zone and then ejected into appropriately positioned bins in dependence on the characteristics of the fruit as determined by the images taken at the photographic zone and the weight recorded at the weighing zone.

The term fruit as used herein embraces part spherical fruit and vegetables such as citrus fruits, apples, potatoes, tomatoes, and like shaped articles.

BACKGROUND OF THE INVENTION

Equipment of this kind usually utilises a series of carriages which are clipped onto a chain driven by sprockets. The carriages carry cups which support the fruit. A series of rotating rollers are arranged to rotate the fruit clear of the cups through a photographic zone. The fruit is then carried by the cups over a weighing zone in which the weight of each fruit is monitored. The cups are usually designed to pivot outwardly to cause the fruit to be ejected at appropriate positions along the conveyor determined by a computer that stores the data from the photographic and weighing zones. Equipment of this kind is very complex and thus expensive. The timing of the operation of components of the equipment is critical and thus setting up the equipment is a lengthy operation for a skilled individual. Furthermore, the power consumption of the motors which drive the sprockets is significant.

It is these issues that have brought about the present invention.

SUMMARY OF THE INVENTION

According to one aspect of the present invention there is provided a fruit handling equipment comprising a first conveyor adapted to transport a line of single pieces of fruit past a camera, over a load cell and through an ejection zone to eject the fruit at predetermined positions along the conveyor, and a second conveyor adapted to mesh with the first conveyor to lift the fruit off the first conveyor and rotate the fruit as it moves past the camera, characterised in that the first conveyor is a chain of fruit carrying carriages pivotally secured end-to-end to define a closed loop, and the second conveyor comprises a plurality of roller supports pivotally secured end-to-end to define a shorter closed loop, whereby each carriage pulls the adjacent meshing roller support.

Preferably, the fruit carrying carriages interlink with the roller carriages and the first conveyor drives the second conveyor.

Preferably, the respective carriages have interfitting formations which accurately line up the carriages and roller supports as the conveyor integrates.

In a preferred embodiment, the fruit carrying carriages and roller supports are manufactured in plastics.

According to another aspect of the invention there is provided a fruit handling equipment comprising a conveyor having a plurality of linked carriages, each supporting a fruit carrying cup supported in a cantilever fashion from each side of the carriage, each cup having a latching mechanism operable to hold the cup in a fruit carrying mode and releasable to cause the cup to pivot to a delatched position to eject the fruit, and remotely controllable means in each carriage to release the latching mechanism.

Preferably each carriage carries a radio controlled solenoid to trigger release of the latching mechanism. The solenoid may be powered by induction.

DESCRIPTION OF THE DRAWINGS

An embodiment of the present invention will now be described by way of example only with reference to the accompanying drawings in which:

FIG. 3a is a perspective view of a roller assembly;

FIG. 3b is a side elevational view of the roller assembly;

FIG. 3c is a plan view of the roller assembly;

FIG. 3d is an end elevational view of the roller assembly;

FIG. 5a is a plan view of one side of the cup carriage assembly;

FIG. 5b is a sectional view taken along the lines A-A of FIG. 5a;

FIG. 7b is a cross sectional view taken through the lines A-A of FIG. 7a;

FIG. 7c is a side elevational view of the assembly shown in FIG. 7a;

FIG. 10 is a perspective view of a cup carriage running on a rail of the conveyor;

FIG. 11 is a sectional view of the carriage running on the rail;

DESCRIPTION OF THE PREFERRED EMBODIMENT

General Layout

Figure 1:
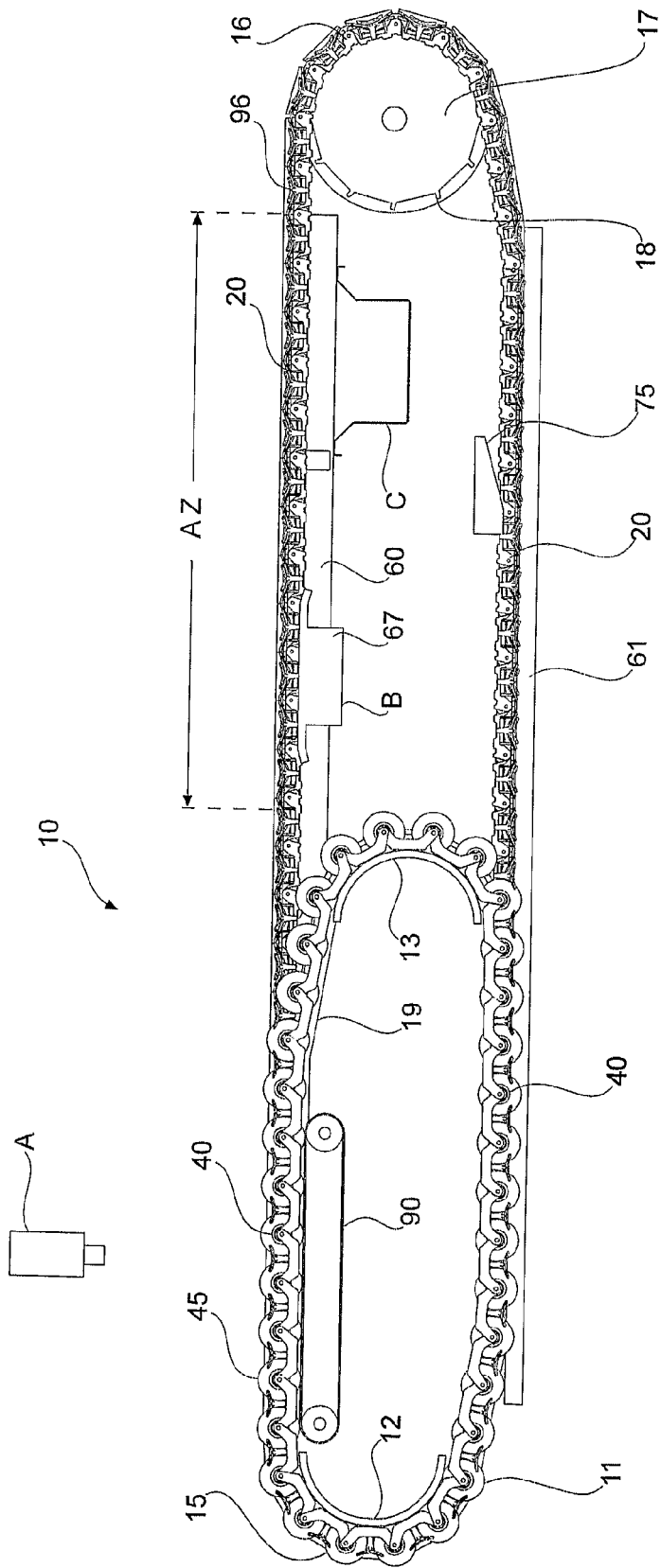
FIG. 1 is a side elevational view schematically showing a two lanes of fruit handling equipment.
Figure 2:
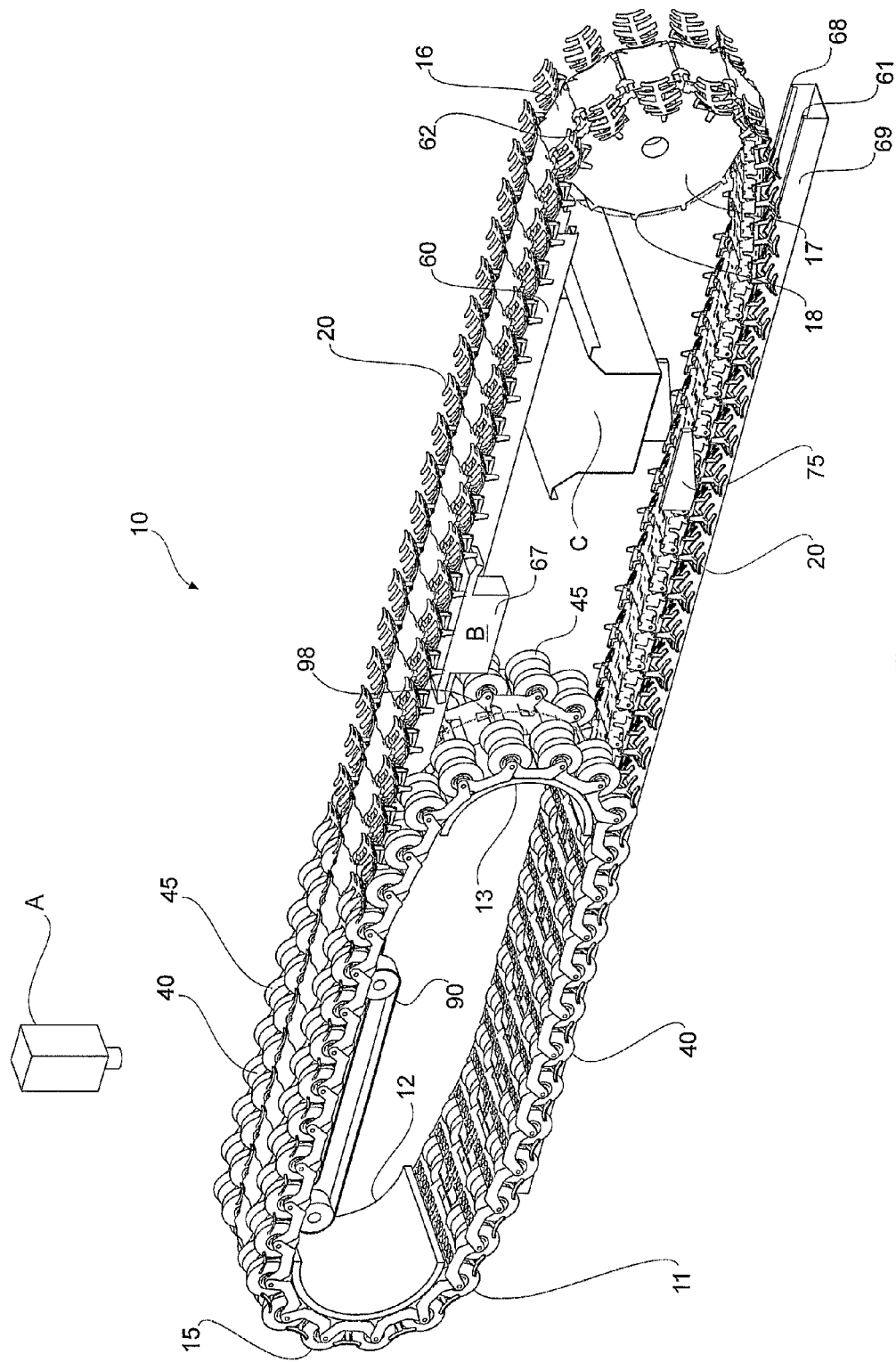
FIG. 2 is a perspective view of the pair of lanes illustrating the inter-engagement of two conveyors forming part of the fruit handling equipment.

The fruit handling equipment of the preferred embodiment essentially comprises a series of parallel lanes each comprising a main conveyor 10 of interlinked fruit carrying carriage assemblies 20 that integrates with a second roller conveyor 11 at one end. A pair of lanes is illustrated in FIGS. 1 and 2.

The roller conveyor comprising a closed loop of pivotally interconnected roller assemblies 40. The roller conveyor 11 is arranged to freely rotate around semi-circular guide drums 12, 13 positioned at each end of the conveyor 11 whereby as the main conveyor 10 returns, the carriage assemblies 20 mesh with the roller assemblies 40 to pass together through a photographic zone A near the end 15 of the main conveyor 10. After the superimposed carriage and roller assemblies 20 and 40 pass the photographic zone A, the roller conveyor 11 descends a ramp 19 to disengage from the cup carriage assemblies 20 to return around the semi-circular guide drum 13. The fruit carrying carriage assemblies 20 of the main conveyor 10 then continue to pass through a weighing zone B to an ejection zone C to return on the underside of the main conveyor 10 as shown in FIG. 1. The portion of the conveyor between the carriage and drum assembly separation and end 16 of the conveyor 10 is referred to as the active zone (AZ).

In this manner, a much shorter secondary conveyor 11 drives the roller assemblies 40 only at the photographic zone A.

The main conveyor 10 is driven at one end 16 by a metal sprocket 17 with plastic tipped teeth 18 and runs at the other end 15 integrated with the roller conveyor 11 on the drum 12. The integration of the two conveyors 10 and 11 ensures that the main conveyor 10 drives the roller conveyor 11 around the drums 12, 13.

Roller Assembly

As shown in FIG. 3, each roller assembly 40 of the roller conveyor 11 comprises a roller support 41 having two pairs of parallel flanges 42, 43 which extend in opposite directions parallel to the longitudinal axis of the conveyor 11. The flanges 42, 43 support each end of a spindle 44 which supports a roller 45. The roller 45 comprises two frusto-conical central members 46, 47 and two larger tapered outer members 48, 49 defining gaps therebetween.

The spacing of the roller flanges 42, 43 on one side is slightly less than the spacing of the roller flanges of the other side so that a series of roller carriage assemblies 40 can be joined together with the pins that support the rollers extending through the flanges 42, 43 of one roller assembly and the flanges of the adjacent roller assembly as shown in FIG. 2. In this way, the roller conveyor is made up of a series of interlinked roller assemblies 40 joined through the spindles 44 to provide a series of pivotal links forming the closed loop which constitutes the roller conveyor 11.

Figure 7B:
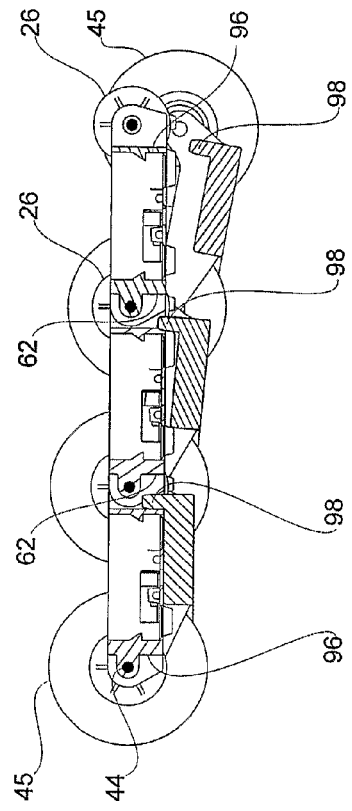

The roller support has an upstanding tooth 98 designed to fit in the slot 62 created between 2 adjacent carriages 20 thereby locating each roller assembly with respect to the carriage conveyor 10 when the two conveyors merge as shown in FIG. 7b. In operation the leading vertical flange 96 of the carriage 20 acts against the upstanding tooth 98 of the roller support causing the roller conveyor 11 to be driven by the main conveyor 10.

Carriage Assembly

Figure 4A:
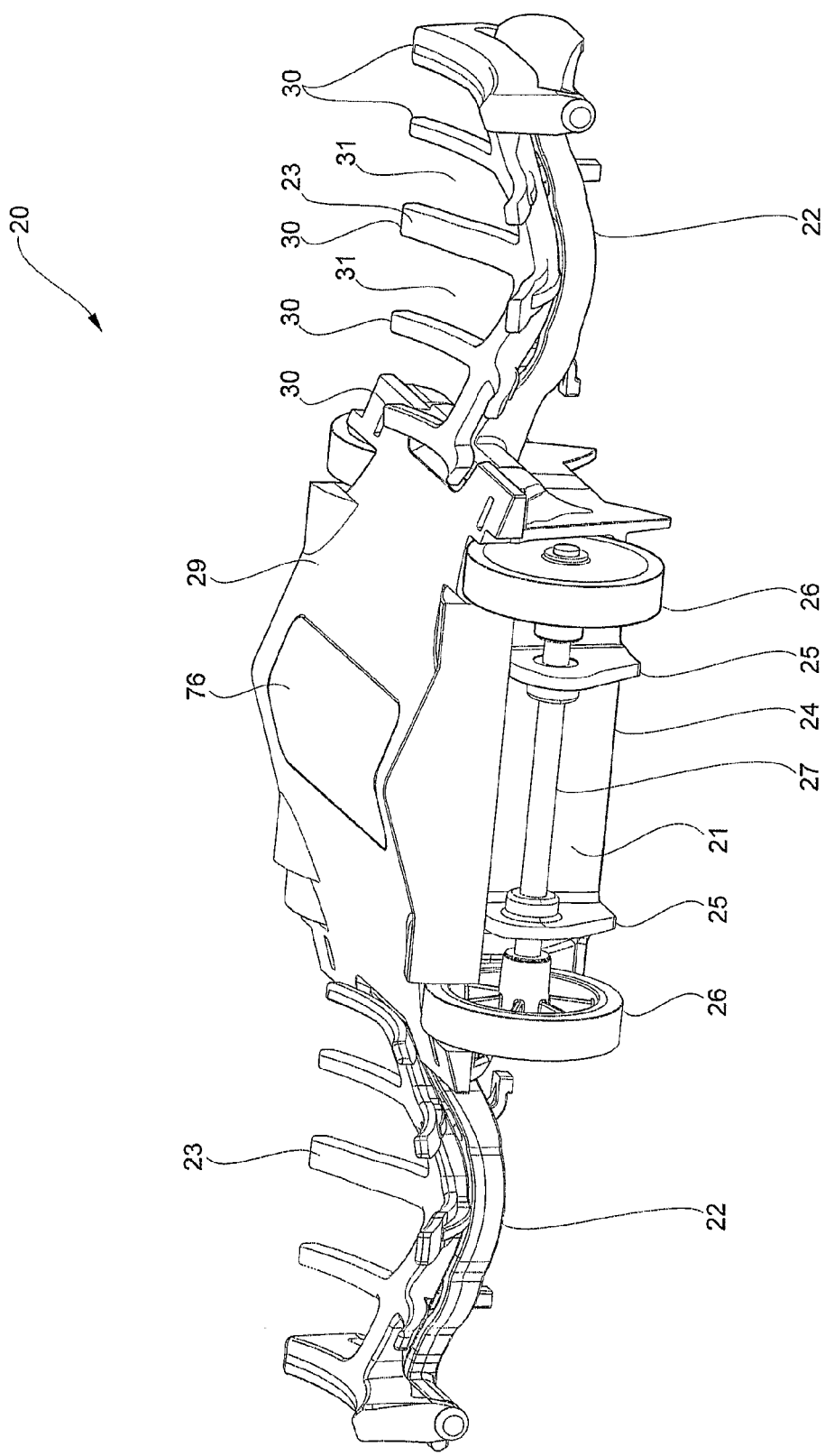
FIG. 4a is a perspective view of a cup carriage assembly with the cups in a latched position.
Figure 4B:
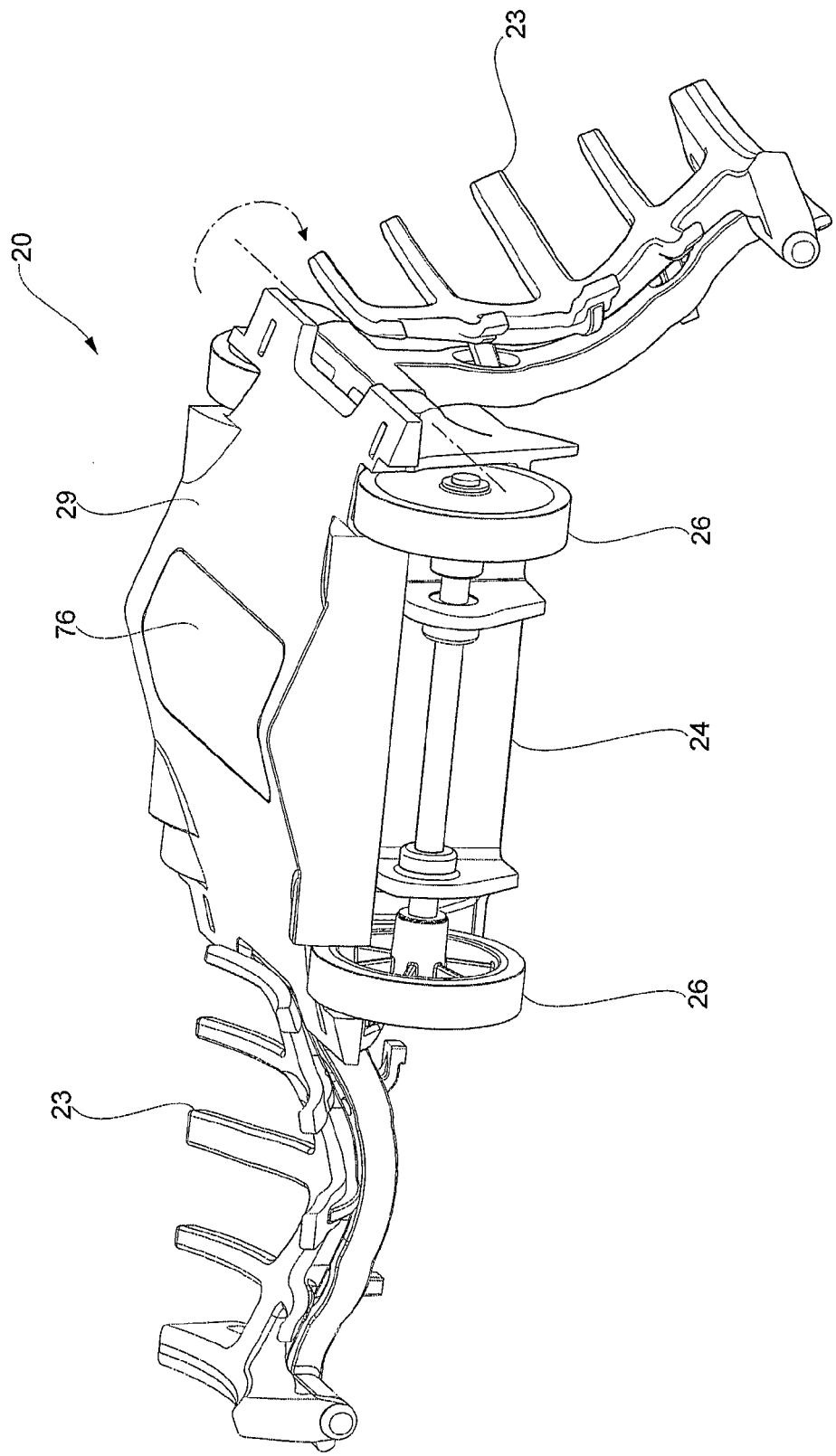
FIG. 4b is a perspective view of the cup carriage assembly with one cup unlatched.
Figure 4C:
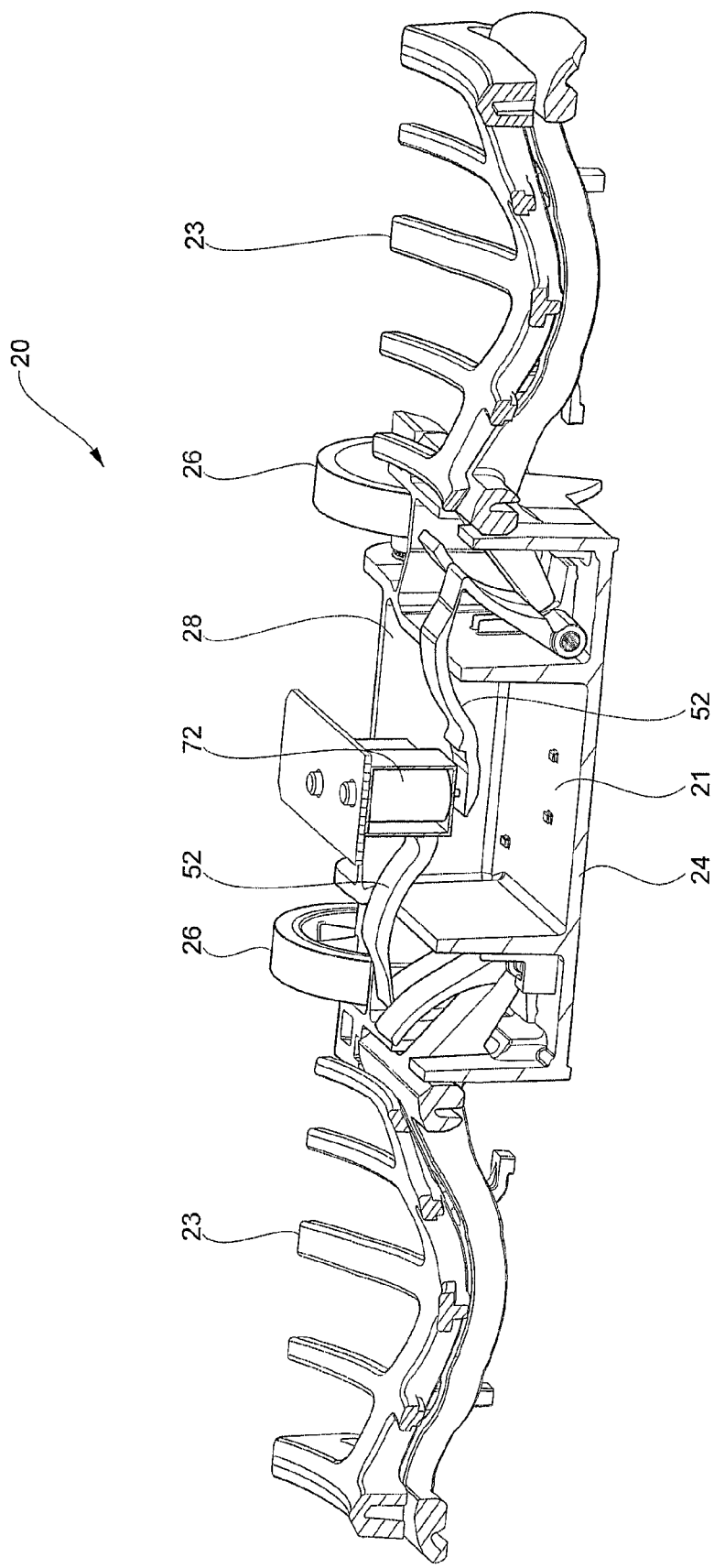
FIG. 4c is a sectioned perspective view of the cup carriage assembly with components removed to illustrate the latching assembly.
Figures 5A, 5B:
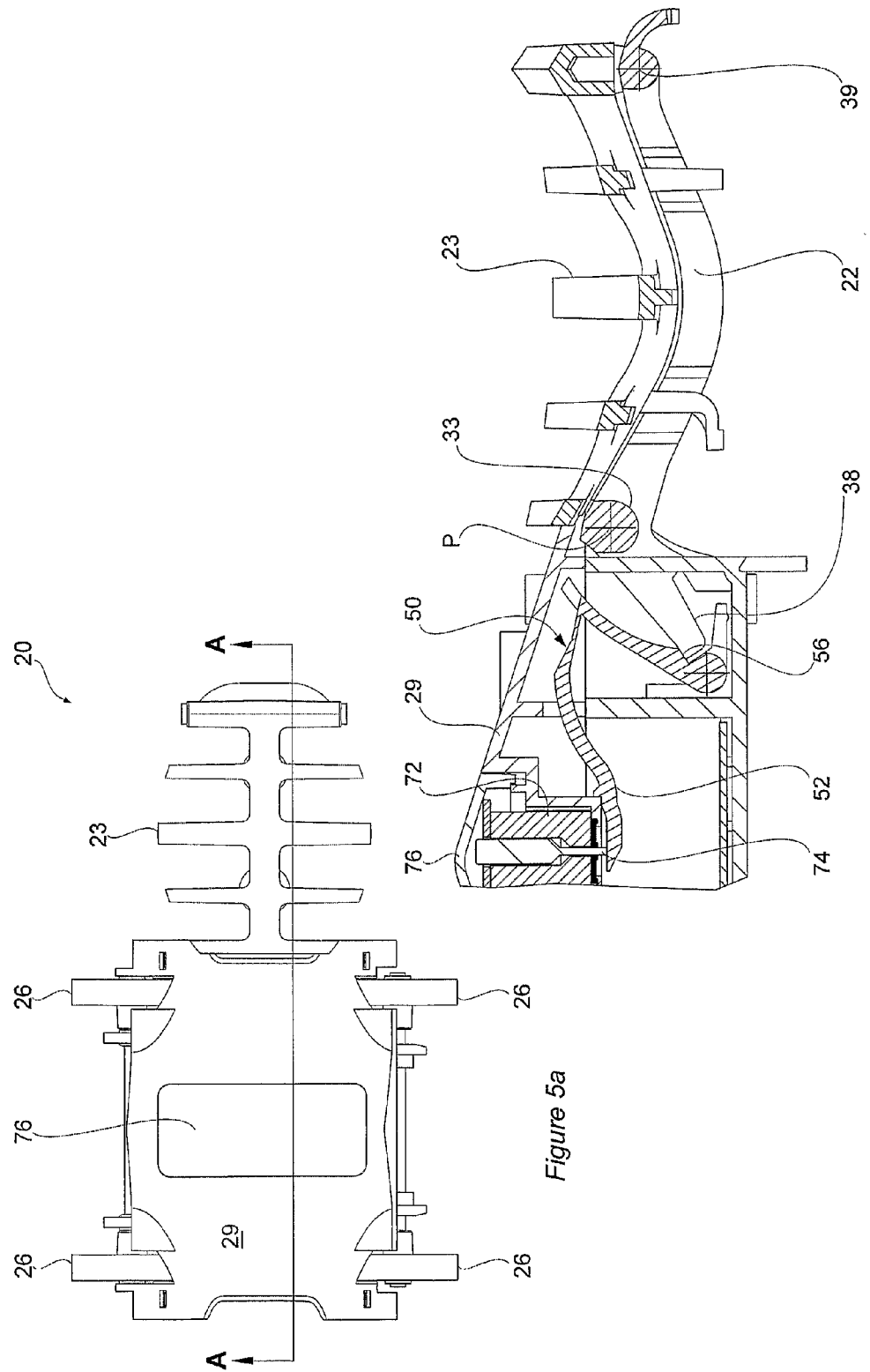
Figure 5C:
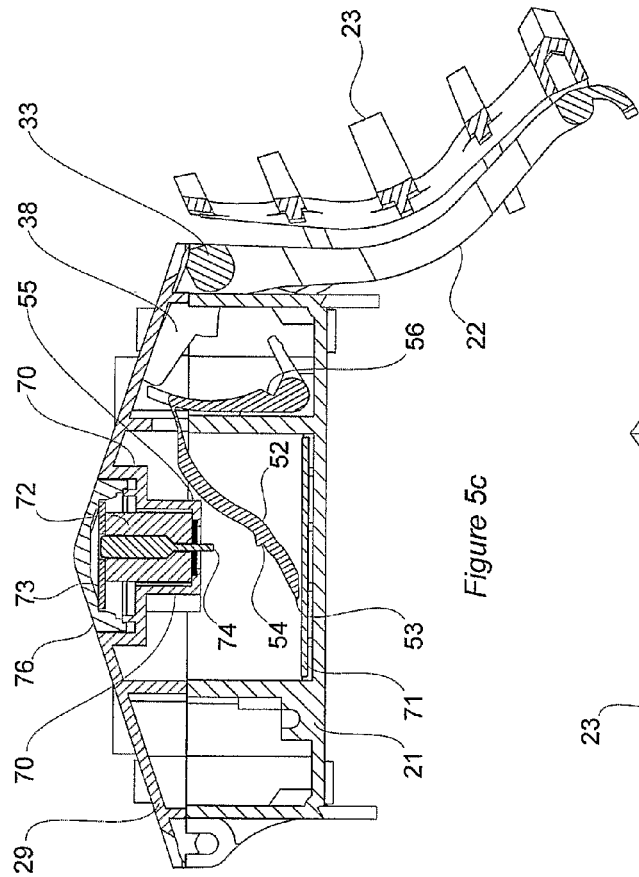
FIG. 5c is the same section view but showing a cup in a delatched positioned.
Figure 6:
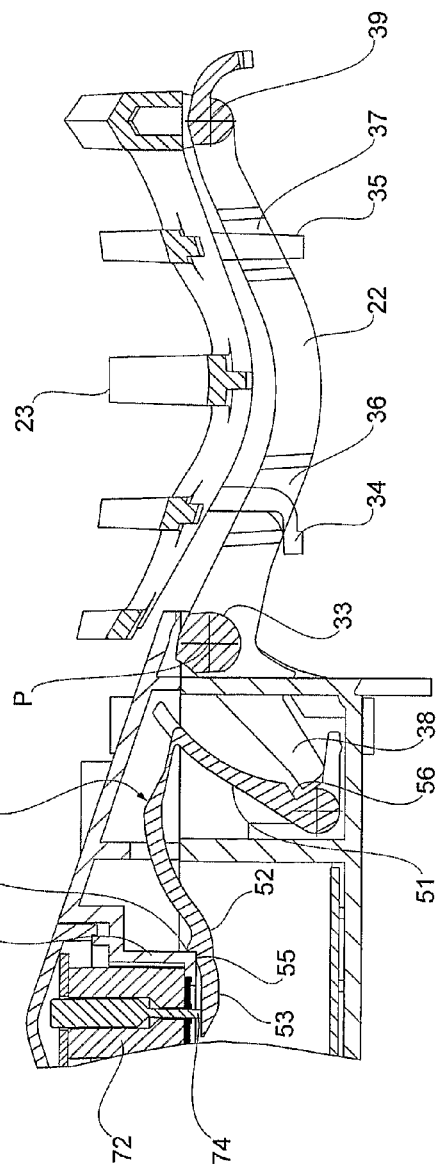
FIG. 6 is a section view taken along the lines A-A of FIG. 5a showing the cup in a weighing position.

In a similar manner, the main conveyor 10 is constituted by a series of links made up by interconnection of the fruit carrying carriage assemblies 20. Each carriage assembly 20, as shown in FIGS. 4 to 6, comprises a central carriage 21 which pivotally supports a pair of laterally extending radius arms 22 on each side, each radius arm 22 in turn supporting a fruit carrying cup 23. The carriage 21 is of rectangular profile with a substantially planar underside 24 and an open recess 28 covered by a removable cover 29 with a pair of outwardly extending flanges 25 at one end supporting a pair of wheels 26 on an axle 27. Two pairs of parallel outwardly extending flanges 25 coaxially fit onto the flanges carrying the wheels at the other end so that carriages can be interlinked through the axle 27 that extends through the flanges of one carriage and the flanges on the end of the adjacent carriage. In this manner, the carriages are pivotally interlinked to form a continuous loop to define the main conveyor 10 as shown in FIGS. 1 and 2.

The radius arm 22 comprises a curved beam with a T-shaped mounting flange 33 on one end which is pivotally secured across the side of the carriage 21. The opposite end of the radius arm pivotally supports one end of the cup 23 through an elongate pivot 39. The underside of the cup has two spaced legs 34, 35 that are arranged to extend freely through a pair of spaced apertures 36, 37 in the curved beam 22 of the radius arm. The pivotal connection of the radius arm 22 to the carriage 21 allows the cup to be supported in a fruit carrying position shown in FIG. 4a and an ejection position shown in FIG. 4b in which the radius arm 22 pivots downwardly to eject fruit carried by the cup 23.

Figure 8:
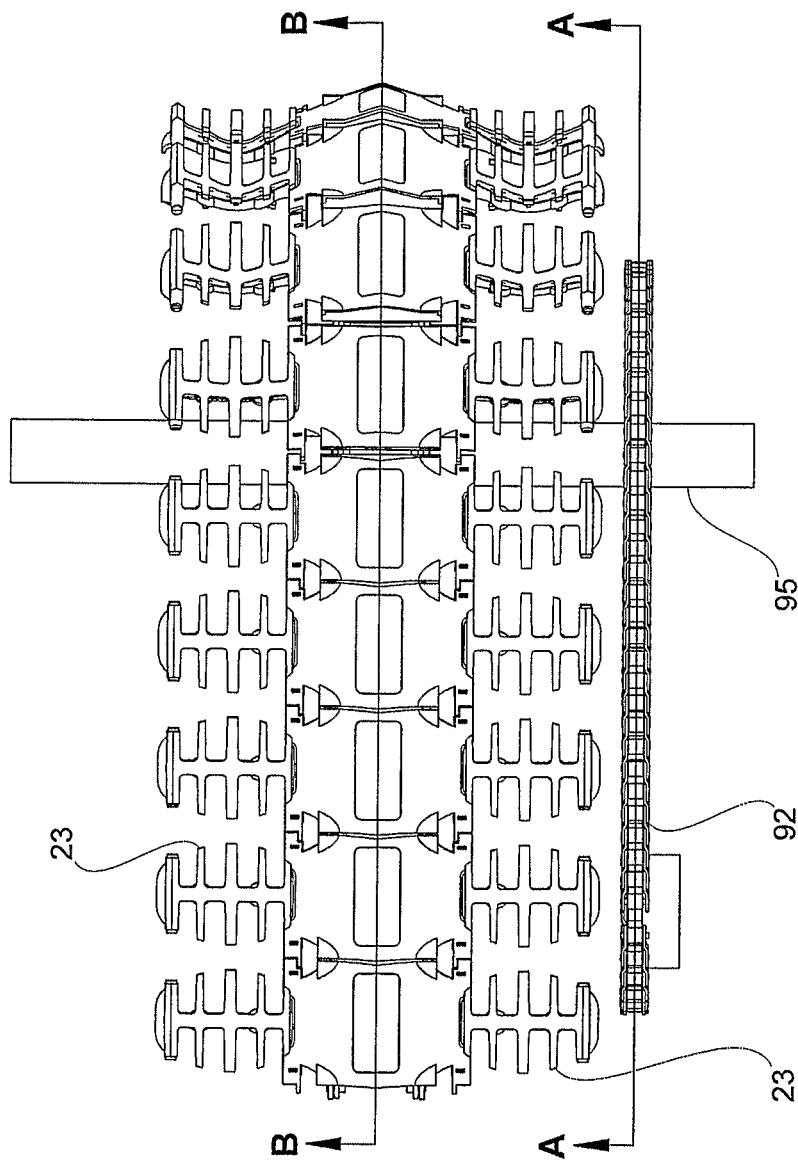
FIG. 8 is a plan view showing part of a sprocket driving the cup carriage assemblies.

As shown in FIG. 4, each cup 23 comprises a dished recess defined by five fingers 30 to define gaps 31 therebetween. The gaps 31 between the fingers 30 of the dish-shaped cup 23 are designed so that when the two conveyors are integrated and the roller assemblies 40 are superimposed on the carriage assemblies 20 the upper surfaces of each roller 45 can extend through the gaps 31 to engage the underside of the fruit to lift the fruit clear of the cup 23 for rotation through the photographic zone A as shown in FIGS. 1 and 2. Once the fruit has passed the photographic zone A, the conveyors 10 and 11 part, causing the rollers 45 to be lowered, as shown in FIG. 8, so that a single piece of fruit then rests on the dish-shaped cup 23.

The radius arm 22 has a downwardly extending foot 38 that engages a latching mechanism 50 mounted in the recess 28 of the carriage 21 to control the position of the cup 23 relative to the carriage 21. As shown in FIGS. 5 and 6, the latching mechanism 50 is a long piece of plastic moulding which includes an L-shaped latching arm 51 that is pivotally secured to the base of the carriage and a trailing detent 52 that is flexibly formed integrally with the rest of the moulding. The detent 52 has a trailing abutment 53 behind a shoulder 54 which is arranged to engage the base 55 of a well 70 formed in the centre of the cover 29 of the carriage. The L-shaped arm 51 accommodates the base of the foot 38 of the radius arm 22 and, as shown in FIG. 5b, there is a shoulder 56 on the interior of the L-shaped arm against which the foot 38 engages in the latched position. The weight of the radius arm 22 and cup 23 causes the assembly to pivot down about the pivot point P. This in turn causes the foot 38 to rest against the shoulder 56 in the L-shaped arm 51, holding the assembly in the latched position, see FIG. 5b. When the detent 52 is pushed down by operation of the solenoid, it flexes relative to the arm 51 causing the shoulder 54 to ride clear of the base 55 of the well 70. The arm 51 then pivots backwards causing the foot 38 to ride clear of the shoulder 56 allowing the radius arm 22 and cup 23 to pivot downwards into the unlatched position shown in FIG. 5c. The interior of the L-shaped arm 51 acts like a gear whereby the foot 38 meshes with its inner surface as it travels from the latched position shown in FIG. 5b to the unlatched position shown in FIG. 5c.

The cups 23 remain in the unlatched configuration as they round the end 16 of the conveyor 10. As they invert, gravity causes the cups 23 to return to the longitudinal position and an inclined plastic ramp 75 on the return consolidates the latching mechanism 50 of each cup 23.

When the main conveyor 10 is assembled, the carriage assemblies 20 are pivotally interconnected through the shaft 27 on the wheels 26 so that there is wheeled support at each end of each carriage 21. These wheels 26 are arranged to run on tracks 60, 61 that are formed by open rectangular aluminium beams 60, 61 which are located on the underside of the top of the main conveyor 10 and on the underside of the return, as shown in FIGS. 1 and 2. As shown in FIGS. 10 and 11, each beam 60, 61 has an open top with inturned flanges 68, 69 that support the wheels 26. The position of the wheels 26 in the carriage is such that, as the carriage assemblies 20 invert on the return, the wheels 26 engage the lower track 61.

Figure 9:
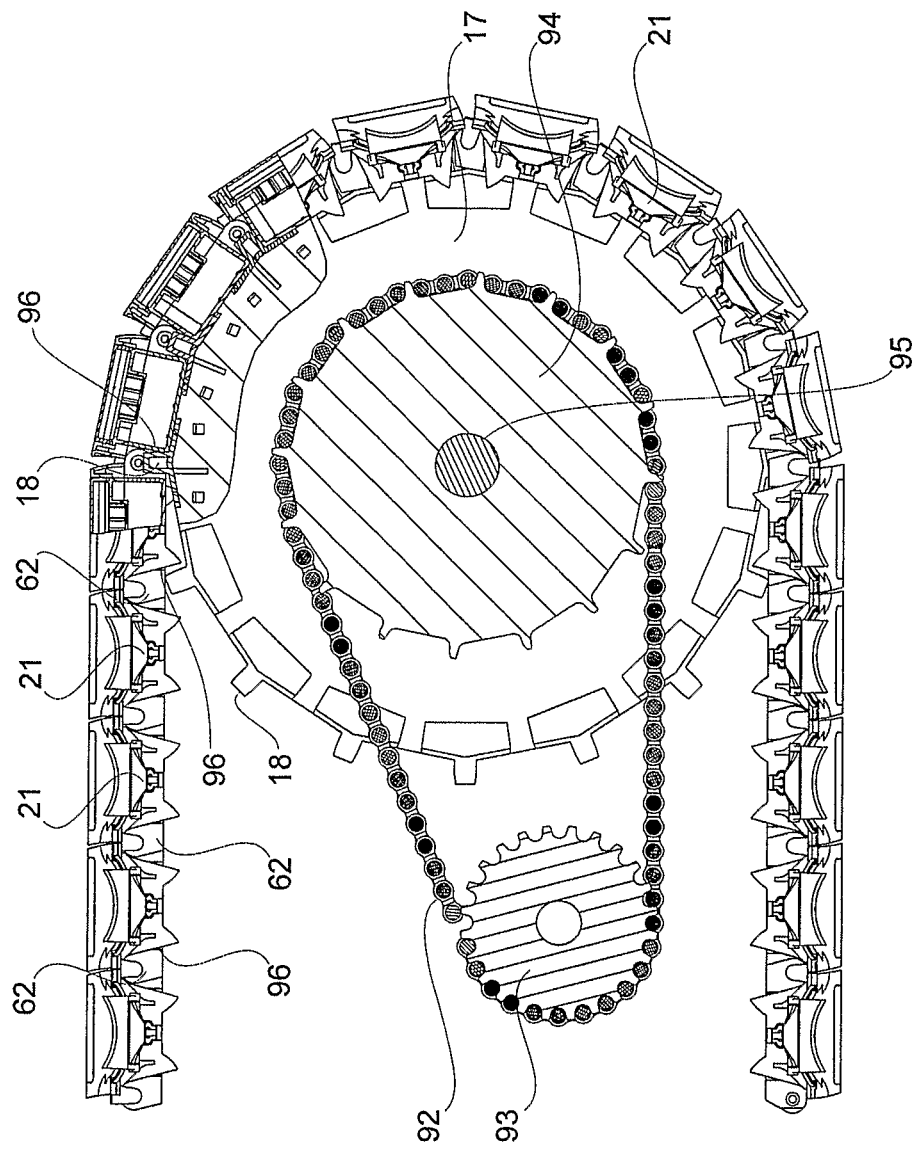
FIG. 9 is a cross sectional view taken along the lines A-A of FIG. 8 and a partial section view taken along the lines BB of FIG. 8.

The adjacent ends of the carriages 21 defines a rectangular slot 62 having a vertical flange 96 which, as shown in FIG. 9, engages the teeth 18 of the drive sprocket 17 rotating in a clockwise direction to impart drive to the main carriage conveyor 10.

The vertical slot 62 also serves to engage with the upstanding tooth 98 on the roller supports to align and integrate the carriages 21 with the roller assembly so that the axes of the carriage wheels 26 coincide with the axes of the roller spindles 44, thus aligning the axes of the pivot points of the links in both conveyors. In use the action of the leading vertical flange 96 of the slot 62 on the upstanding tooth 98 of the meshed roller support forces the roller conveyor 11 to move in unison with the main carriage conveyor.

Photographic Zone

As the two conveyors 10 and 11 merge on the return, the inverted carriage assemblies 20 support the roller assemblies 40 on the track 61. As the integrated conveyors invert, the roller assemblies in turn support the carriage assemblies 20. Between the drum 12 and ramp 19, a pair of driven belts 9 are positioned on each side of the conveyors 10 and 11 to engage the underside of the rollers 45 to cause them to rotate about their axes to in turn rotate the fruit as it is lifted clear of the carrying cups 23 as the two inter-engaged conveyors move past the photographic zone A. The belts 9 provide the support for the assembly of the two conveyors 10 and 11. At least one CCD camera is located in the photographic zone A to view the rotating fruit as it passes that zone and to forward a digital signal to a computer.

Weighing Zone

The spaced legs 34, 35 on the underside of each cup 23 are arranged to engage a load cell 67 arranged in the path of the underside of the conveyor 11 at the weighing zone B. As shown in FIG. 6, the load cell 67 lifts the cup 23 off the carriage 21 and ensures that there is no component of the horizontal movement distorting the actual weight measured by the load cell. The two-point weighing legs 34, 35 ensure that each piece of fruit is accurately weighed as it passes over the load cell 67. The data is then fed to the computer.

Control of Ejection

Figure 12:
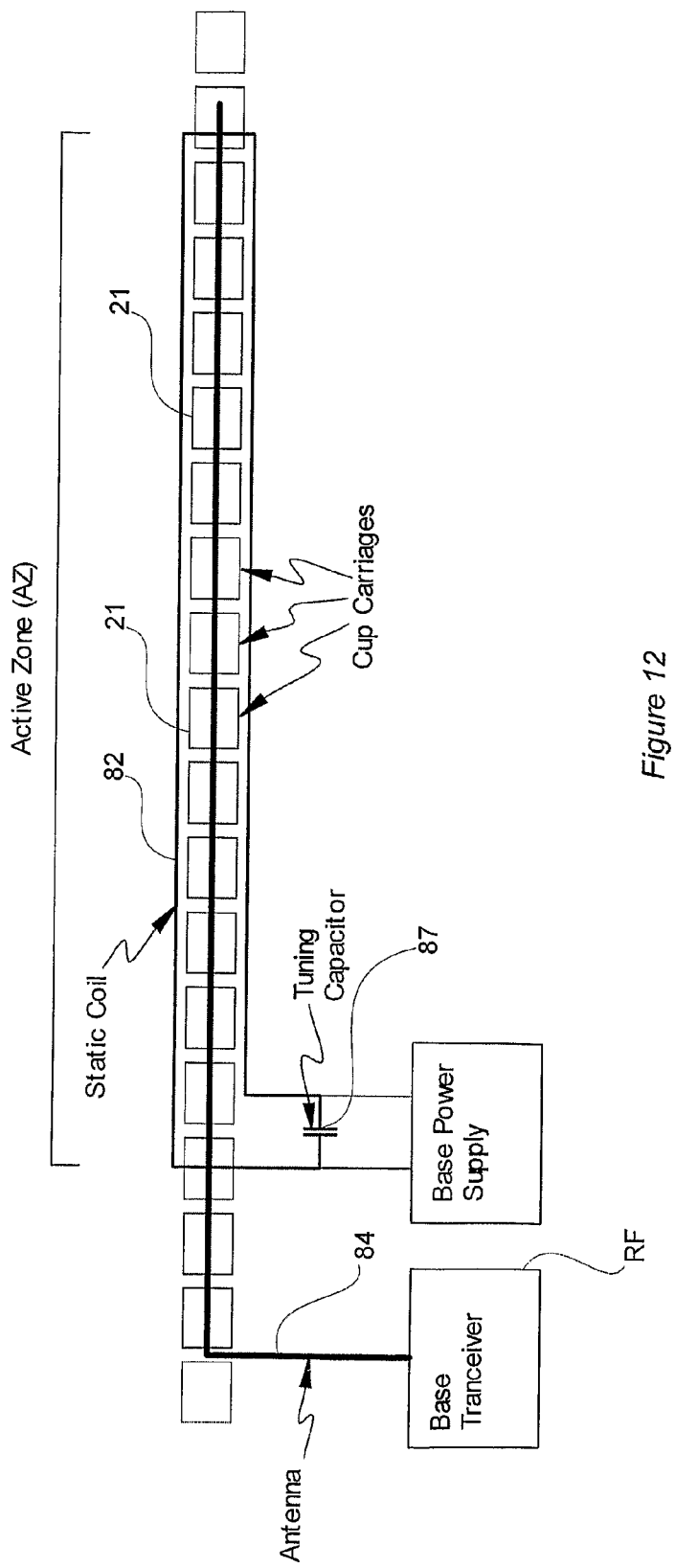
FIG. 12 is a schematic circuit diagram illustrating the association of a radio transceiver and power supply with the fruit handling equipment.
Figure 13:
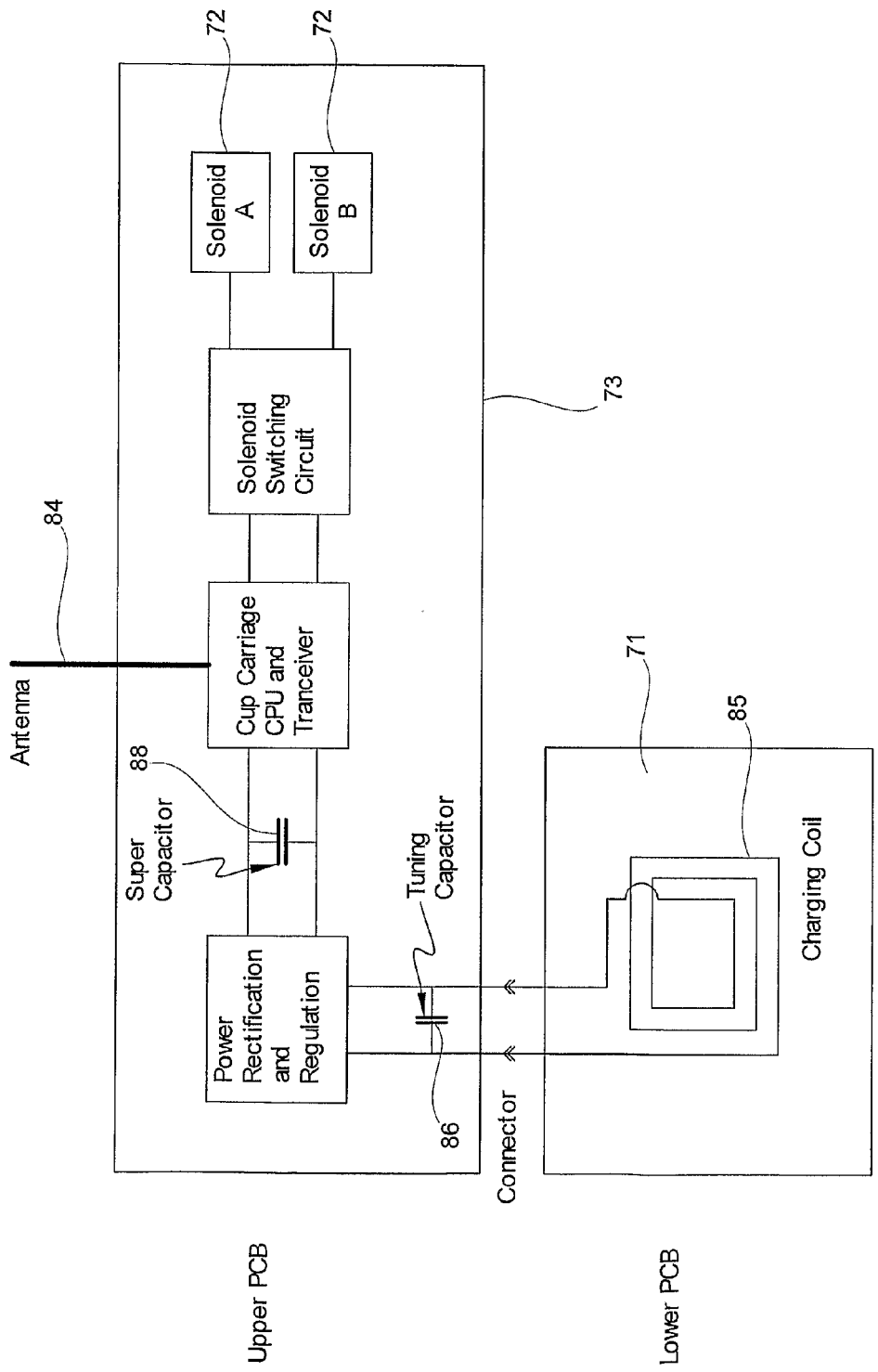
FIG. 13 illustrates the electrical circuitry carried by each carriage.

The recess 28 which is formed in the carriage 21, has a base that supports a first circuit board 71 and the well 70 that is positioned internally of the cover 29 houses a solenoid 72 with an upper circuit board 73 positioned on the top of the solenoid 72. The solenoid has a plunger 74 that operates to push down against the abutment 53 of the detent 52 to release the latching mechanism as shown in FIGS. 5c and 11. The power to drive the solenoid 72, the radio signal which activates the solenoid and the circuit associated with the release mechanism is illustrated in FIGS. 12 and 13. The well 70 is closed off by a lid 76 which sits flush with the cover 29 of the carriage 21. The cover 29 and lid 76 and the associated well 70 ensure that the latching mechanism and solenoid release and associated circuit board 73 are housed in a clean discrete area where they will not be subjected to dust and debris which is often present in apparatus such as this.

The release of the cups 23 to the unlatched position is triggered by a remote activation system that operates on the use of a radio frequency signal to activate the solenoid. The section of the conveyor between the position where the rollers part from the carriages to the drive by the main sprocket is defined as the active zone (AZ) of the conveyor. It is in this zone that power is supplied to the carriages together with carefully controlled radio waves to trigger release of the latching mechanisms. The electrical circuitry is illustrated in FIGS. 12 and 13.

As shown in FIG. 10, each rail 60 in the active zone AZ of the conveyor has transversely positioned spaced brackets 80 which have upstanding lugs 81 that support a wire coil 82 in the form a rectangular frame closed at one end. This coil 82 is positioned adjacent the flanges 68, 69 which support the wheels 26 of the carriage 21. The lugs 81 also supports a centrally positioned co-axial antenna cable 84 which is again positioned just under the carriage 21. As shown in FIG. 11, the first lower circuit board 71 on the base of the carriage 21 is wired to the upper circuit board 73 positioned above the solenoid 72 in the well 70.

The power is supplied to the solenoids by magnetic resonance inductive coupling between a long static power source coil, that is the wire coil 82, and a small coil 85 mounted on the lower circuit board 71 in each carriage 21. The magnetic inductive coupling is particularly desirable because there are no wearing parts. The static coil 82 is coupled to a tuning capacitor 87 as shown in FIG. 12 to cause the coil to resonate at a frequency matched by a AC power source. The small coil carried in the base of the carriages 21 is tuned by capacitor 86 to resonate at the same frequency as the power supply so that, as the coil passes over the static coil, energy is transferred to the moving coil. Subsequently, the AC power from the small coil on the lower circuit board 71 is rectified and regulated to supply DC power to a super capacitor 88 on the upper circuit board 73, see circuit diagram in FIG. 13.

Instead of supplying power by use of magnetic resonance, it is understood that each carriage could be powered by an electronic storage device such as capacitor or battery contained in each carriage. The preferred method of charging the storage device is an electromagnetic coil contained in the carriage passing over a magnetic field on the conveyor which causes and electrical current to be generated in the carriage coil. Other methods include microwaves, electromagnetic induction, or direct driven using the motion of the conveyor carriage. Alternatively the power may be supplied via a direct electrical contact with a supply source i.e. using brushes, pins or through the wheels. The power may also be supplied via a replaceable battery or other storage device.

The radio frequency (RF) system comprises a base RF transceiver per row of carriages. Each transmitter serves two lanes and is controlled by the computer. Each carriage carries a transceiver. To minimise transmission distance from the base to the receivers, the co-axial antenna 84 runs parallel to and immediately below the carriage bases. This configuration minimises RF power and reduces the likelihood of interference between adjacent pairs of lanes. It is also understood that the use of slightly different carrier frequencies on adjacent lanes further reduces interference issues.

Since power consumption of the remote circuit board in the RF active mode is relatively high, the RF activity is restricted to the active section of the conveyor. On each remote circuit board, at the point where the capacitor charging ceases, just prior to the main drive sprocket, the RF system is switched off and the processor enters a low power consumption sleep mode. At the recommencement of charging, the processor is woken and the RF system reactivated at the start of the active zone (where the rollers separate from the carriages). As the length of the conveyor where the RF system is active corresponds with the charging zone, the super capacitor 88 remains fully charged. This capacitor is required as a buffer for the electronics when in sleep mode and for a short, high powered burst to operate solenoids S1 and S2. The capacitor also maintains power to the circuit boards during short breaks in conveyor operation.

In this ejection system, the link (carriage assembly 20) houses an electronic circuit that can receive and process radio signals (or other type of electromagnetic signal) from the main conveyor controller which would be coupled to the computer. This signal tells the link when or where to delatch the cups. The conveyor controller tells the link when to drop by calculating or identifying its location and then sending the signal to delatch the cups when the link is in position at the drop point. Alternatively the conveyor controller may send the signal to the link to delatch at a predetermined location. The link then senses (by barcode and optical sensor, RFID tag, counting pulses to measure distance or time or other suitable means) when it has reached the correct location and delatches.

An advantage of this ejection system is that the delatching is triggered remotely from the conveyor controller. So long as the cup is in approximately the correct location with respect to the drop point (say 50 mm) it can be triggered by the controller. This also means that the cup triggering position may be varied automatically by the controller depending upon the conveyor speed thereby allowing for the trajectory of the fruit and giving control over the where the fruit lands.

Jitter

As shown in FIG. 9, the drive system has been specifically designed to eliminate chordal action which usually results in significant oscillation in conveyor velocity due to the large pitch conveyor chain being positioned around a relatively small drive sprocket. The drive sprocket 17 which directly drives the carriages 21 has sixteen teeth, each of which is covered with a plastics tip 18 to reduce noise and wear. However, as the carriages 21 move over the plastics coated tips 18, a pulsing action is generated which can cause between 1% and 1.5% speed change. This is usually referred to as jitter. Instead of directly driving the shaft of the main sprocket 17 through an electric motor, a separate smaller chain drive 92 is provided in which the output sprocket 93 on an electric motor (not shown) is coupled to a smaller drive sprocket 94 mounted on a shaft 95 which is common to the main driving sprocket 17. A conventional chain 92 effects this drive. The smaller drive sprocket 94 is also designed to have sixteen teeth but operates at a different pitch. The drive to the smaller drive sprocket 94 introduces jitter in the same way that the main drive introduces jitter. In this system, the jitter of the smaller drive sprocket 94 is arranged to be timed to be inverse to the jitter caused by the main sprocket 17 so that the two jitters balance to provide a smooth drive.

Features

The majority of the components of this conveyor are manufactured from plastics. The plastics components are designed to be produced through a simple moulding process and the use of plastic componentry to make up the links of the two conveyors substantially reduces the overall weight of the assembly by doing away with a conventional chain to, in turn, substantially reduce the power required to drive the assembly. The assembly is also designed to reduce drag. The carriages run on wheels that engage a track even in the return configuration, see FIG. 2. It is estimated that the assembly will operate on 25% of the power used to drive similar such assemblies. The use of plastics for the componentry of the assembly also substantially reduces the noise of the equipment in operation. The noise can be further reduced by coating the portion of the track which engages the wheels of the carriages and, as described earlier, coating the tips of the drive sprockets.

Figure 7C:
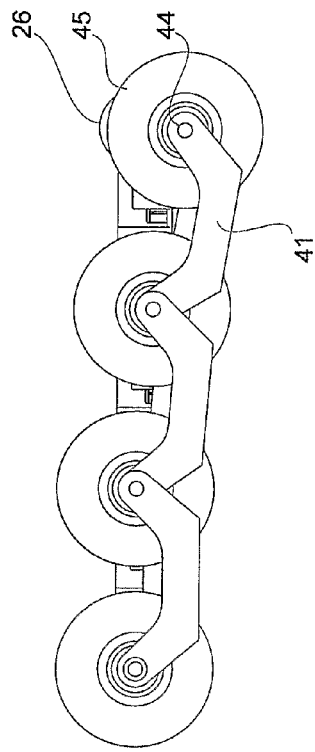
Figure 7A:
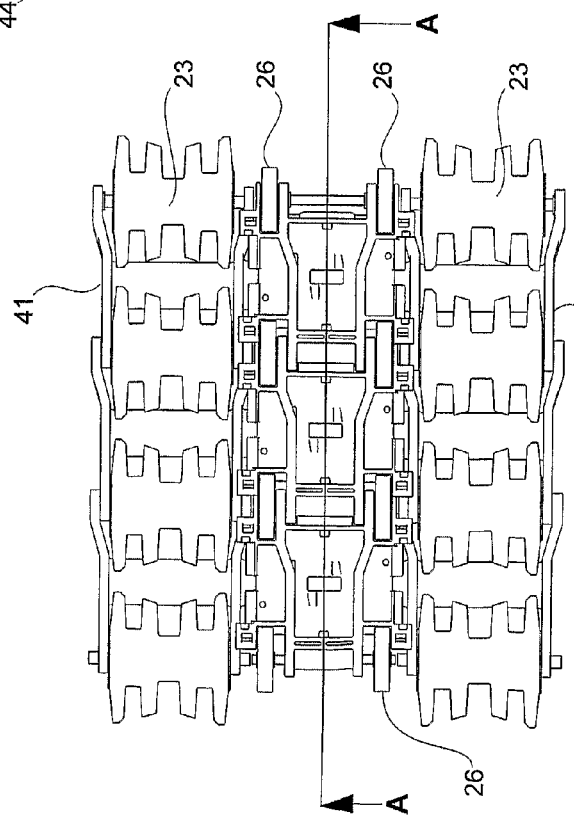
FIG. 7a is a plan view of the cup carriage conveyor superimposed with the roller conveyor.

Conveyors of this kind are usually 50-60 m in length and thus providing a much smaller roller conveyor of about 8 m in length substantially reduces the number of components and complexity of the arrangement. The inter-engagement of the two conveyors is shown with reference to FIG. 7. The axes of the wheels 26 on the cup carriage assemblies 40 are arranged to align with the axes of the rollers 45 on the roller assemblies 40. The underside of each roller support 41 has a central portion which defines a centrally positioned, upstanding trapezoid tooth 98 that is arranged to be a sliding fit against a vertical flange 96 at either end of the carriage 21. The vertical flanges 96 of adjacent carriages 21 define leading and trailing walls of the slot 62 which accommodates the trapezoidal teeth 98 of the roller support 41 as shown in FIG. 7b. In this way, as the two conveyors come together, the upturned roller conveyor 11 engages and supports the carriage 21 of the main conveyor 10, causing the axles 27, 44 of the wheels 26 and rollers 45 to align and bringing the two conveyors into a meshed configuration. Alignment of the axes of the pivot points of the roller carriages with axes of the roller assemblies when the two conveyors are meshed allows the meshed section of conveyors to flex and travel around the semicircular drive drums without any longitudinal movement between the two conveyors. The location of the tooth 98 against the flange 96 takes up any slack in the pivots between carriages 21 and roller supports 41 and ensures that the two conveyors 10, 11 are accurately aligned when they come together. The action of the leading vertical flange 96 of the slot 62 against the tooth 98 of the roller support 41 allows the main carriage conveyor 10 to impart the driving force to the roller conveyor 11 thereby allowing the single drive sprocket 17 to power both conveyors As the two conveyors 10 and 11 part after the photographic zone A, the roller conveyor 11 simply drops away from the underside of the cup conveyor 10, see FIGS. 7b and 7c. The all plastics componentry reduces the running resistance and the reduction in the number of rollers reduces the load on the main conveyor thus substantially reducing the power needed to drive the assembly. It is envisaged that the equipment described above is cheaper to build, simpler to assemble and maintain and uses substantially less energy. The assembly is quieter, more efficient and more reliable and, in consequence, easier to service. It is thought that the accuracy of the equipment will be also enhanced.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. Fruit handling equipment comprising:
   a transport conveyor having a plurality of linked carriages,
   each carriage supporting at least one fruit carrying cup pivotally secured to the carriage,
   each cup having a latching mechanism which holds the cup in a fruit carrying mode and which is releasable to cause the cup to pivot from the fruit carrying position to a delatched ejection position to eject the fruit from the cup, and
   each carriage having a remotely controllable device which releases the latching mechanism thereof and hence causes the cup thereof to move from the fruit carrying position to the ejection position.

2. Fruit handling equipment according to claim 1, wherein the remotely controllable device of each carriage includes a radio controlled solenoid to trigger release of the latching mechanism.

3. Fruit handling equipment according to claim 2, wherein each solenoid is powered by induction.

4. Fruit handling equipment according to claim 2 wherein each cup has a foot that engages an abutment in a latched position, displacement of the solenoid causing displacement of the abutment which releases the foot causing the cup to pivot to the delatched ejection position.

5. Fruit handling equipment according to claim 1, wherein each carriage has a fruit carrying cup pivotally supported in a cantilever fashion from each side of the carriage.

6. Fruit handling equipment according to claim 1,
wherein the transport conveyor transports a line of single pieces of fruit past a camera, over a load cell and through an ejection zone to eject the fruit at predetermined positions along the conveyor, and
further including a second conveyor which meshes with the transport conveyor to lift the fruit off the transport conveyor and rotate the fruit as the fruit moves past the camera,
wherein the transport conveyor is a chain of the fruit carrying carriages pivotally secured end-to-end to define a closed loop,
wherein the second conveyor comprises a plurality of roller supports pivotally secured end-to-end to define a shorter closed loop, and
wherein each roller support of the second conveyor meshes with a carriage of the transport conveyor whereby each carriage pulls the adjacent meshing roller support.

7. Fruit handling equipment according to claim 6, wherein a drive sprocket engages the carriages at one end of the transport conveyor to drive the transport conveyor.

8. Fruit handling equipment according to claim 6, wherein the carriages and roller supports have interfitting formations which accurately line up the carriages and supports as the transport and second conveyors mesh.

9. Fruit handling equipment according to claim 8, wherein when the transport and second conveyors mesh, the pivot axes of the roller supports and carriages align.

10. Fruit handling equipment according to claim 6, wherein each carriage has a pair of axially rotatable wheels which engage a beam positioned underneath the top of the transport conveyor and a beam positioned underneath the return of the transport conveyor.

11. Fruit handling equipment according to claim 6, wherein each roller support supports axially rotatable rollers that are linearly displaceable relative to the carriage to engage and rotate the fruit.

12. Fruit handling equipment according to claim 10, wherein an arcuate surface is positioned at each end of the second conveyor whereby the rollers engage the surfaces as the second conveyor is driven by the transport conveyor.

13. Fruit handling equipment according to claim 10, wherein a separate drive is positioned underneath the rollers to lift and rotate the rollers as the meshed transport and second conveyors move past a photographic zone.

14. The fruit handling equipment according to claim 7, wherein the drive sprocket has tips coated in rubber or plastics that engage the underside of the carriages.

15. Fruit handling equipment according to claim 7 wherein the drive sprocket is driven by a shaft which is in turn driven by an auxiliary sprocket having a same number of teeth as the drive sprocket but arranged at a different pitch, whereby the timing of the drive is such that jitter caused by the auxiliary sprocket counter balances jitter caused by the drive sprocket.

16. Fruit handling equipment according to claim 6, wherein the fruit carrying carriages and roller supports are manufactured in plastics.

17. The fruit handling equipment according to claim 6, wherein a fruit carrying cup is supported in a cantilever fashion from each side of the carriage, each cup having a latching mechanism operable to hold the cup in a fruit carrying mode and releasable to cause the cup to pivot to a delatched ejection position to eject the fruit.

18. Fruit handling equipment according to claim 17, wherein each carriage carries a radio controlled solenoid to trigger release of the latching mechanism.

19. Fruit handling equipment according to claim 18, wherein the solenoid is powered by induction.

20. Fruit handling equipment according to claim 1, further including a computer which remotely controls, in accordance with a transport speed of the transport conveyor, the remotely controllable device of each carriage to effect the releasing of each latching mechanism.

* * * * *